June 14, 1938.  C. L. SPRANKLE  2,120,945
WINDSHIELD WIPER TENSION ARM
Filed Aug. 11, 1937
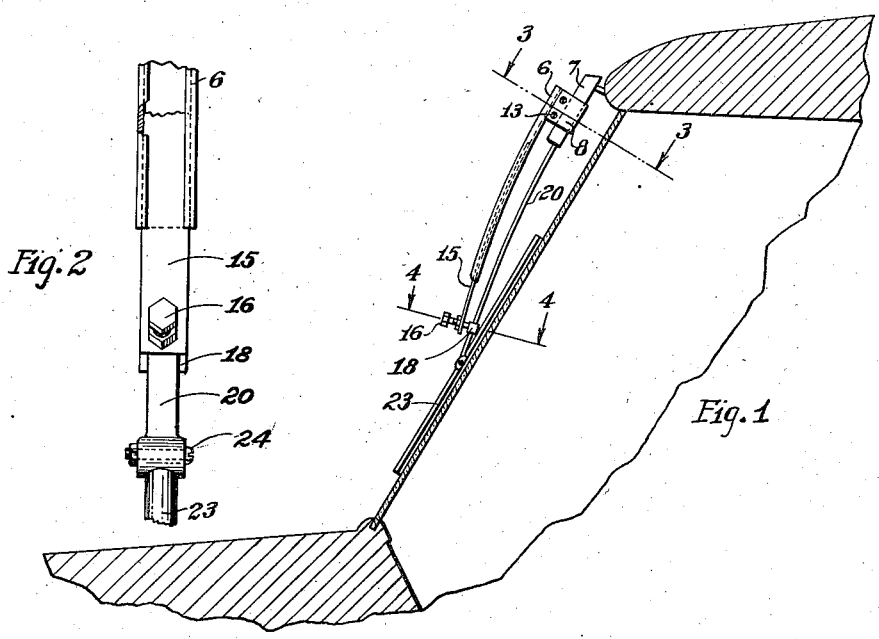
Fig. 2
Fig. 1
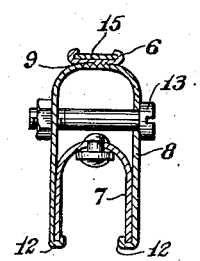
Fig. 3
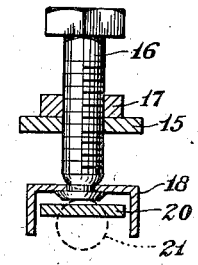
Fig. 4
INVENTOR.
CHARLES L. SPRANKLE.
BY
ATTORNEYS Patented June 14, 1938

2,120,945

UNITED STATES PATENT OFFICE 2,120,945

WINDSHIELD WIPER TENSION ARM

Charles L. Sprankle, Cleveland, Ohio

Application August 11, 1937, Serial No. 158,521

3 Claims. (Cl. 15—255)

This invention relates to windshield wipers and more particularly to a tensioning device adapted to regulate and control the pressure of the windshield wiper against the windshield glass.

It is among the objects of my invention to provide a simple, efficient windshield wiper arm tensioning device which is adapted to be secured to a conventional windshield wiper arm and regulate the pressure of the windshield wiper blade against the glass in the manner to effect the most efficient wiping action. It is a further object of my invention to provide a tensioning device for a windshield wiper arm which is adapted to be secured to a conventonal wiper arm adjacent the wiper arm-to-motor shaft connection and bear against the other end of the windshield wiper arm to force the same towards the windshield glass. It is a further object of my invention to provide a tensioning device in accordance with the preceding object which is adjustable in length so as to accommodate wiper arms of various lengths and so as to vary the effective point of tension application. Other objects and advantages relating to simplicity and economy in manufacture will appear from the following description and the appended drawing wherein:

Figure 1 is an assembly showing my tension device applied to a windshield wiper arm;

Figure 2 is a view with parts broken away taken at right angles to the view of Figure 1;

Figure 3 is a cross section taken along the line 3—3 of Figure 1;

Figure 4 is a cross sectional view taken along the line 4—4 of Figure 1.

Numerous attempts have been made to provide a windshield wiper arm in which the tension of the wiping blade against the glass may be controlled so as to obtain the most effective wiping action. Ordinarily the adjustable tension wiping arm has been obtained by incorporating within the arm structure itself springs, hinges and the like which have added considerably to the cost of the finished article and have been so constructed as to have a relatively short life in service. It is among the principal objects of my invention to provide a tensioning device which will not require the substitution of the wiper arm in its entirety by providing a tensioning device which may be applied to the conventional wiper arm while the same is still mounted on the motor vehicle.

I have obtained the objects and advantages outlined generally above by mounting a relatively rigid channel 6 upon the rigid portion 7 of a conventional windshield wiper arm 20. The channel 6 is secured to the wiper arm preferably by means of a depending U-shaped bracket 8 which may be spot welded or otherwise secured to the channel as at 9. The side portions of the bracket 8 are provided at their free edges with inturned flanges 12 which are adapted to embrace or engage the free edges of the open channel of the rigid portion 7 of the wiper arm. The portions 12 may be sprung over the lower edges of the arm portion 7 and the bracket in its entirety drawn into tight frictional engagement with the portion 7 by means of the clamping bolts 13.

The channel 6 mounted upon the bracket 8 frictionally carries a tension blade 15 which may be adjusted longitudinally of the channel and the free end of the resilient blade 15 carries an adjusting screw 16 having a lock nut 17 to secure the screw in its adjusted position. The shank end of the screw is preferably swiveled to a U-shaped saddle 18 and said saddle is proportioned so as to accommodate either flat wiper arms 20 or round wire arms 21, both of which are more or less conventional.

It will be understood that the tensioning device of my invention may be readily applied to a wiper arm without dismantling the wiper arm assembly by simply loosening the clamping bolts 13 and snapping the bracket 8 over the wiper arm portion 7 and drawing the bolts into clamping engagement. After the tensioning device has been applied to the arm and the saddle 18 adjusted to the desired position along the arm 20, the screw 16 may be adjusted so as to obtain the desired wiping action of the blade 23 which is secured to the arm by a bolt 24 or equivalent means. The tightening of the lock nut 17 will maintain the tensioning effect of the screw and efficient wiping action is assured.

Although I have shown and described one embodiment of my invention in considerable detail, it will be appreciated by those skilled in the art that numerous changes or modifications may be made therein without departing from the scope of the invention as defined in the following claims.

I claim:

1. In combination with a resilient windshield wiper arm having one end rigidly mounted for oscillation and having the other end connected to an intermediate part of a wiper blade engaging the windshield, a resilient member secured to said arm adjacent the mounting thereof extending along said arm and engaging the same adjacent its point of connection to said blade to exert a flexing pressure on said arm relative to said member to press the blade against the windshield.

2. In a tensioning device for a windshield wiper arm, a channel secured to the motor shaft end of a wiper arm, a tension blade slidably arranged within said channel to overhang the other end of said wiper arm and an adjusting device extending from said blade adapted to engage said other end of the wiper arm.

3. In combination with a windshield wiper arm having a relatively rigid U-shaped portion on one end rigidly attached to a motor shaft, a tensioning device for said arm comprising a U-shaped bracket adapted to embrace said U-shaped arm portion and be clamped thereon, a tension blade portion extending laterally from said bracket to overhang the other end of said wiper arm and an adjusting device mounted at the free end of said tension blade in a manner to engage said other end of said wiper arm.

CHARLES L. SPRANKLE.